(12) United States Patent
Sato et al.

(10) Patent No.: US 8,135,051 B2
(45) Date of Patent: Mar. 13, 2012

(54) GAS LASER OSCILLATOR

(75) Inventors: Takanori Sato, Yamanashi (JP);
Takafumi Murakami, Yamanashi (JP);
Yuji Nishikawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/502,390

(22) Filed: Jul. 14, 2009

(65) Prior Publication Data

US 2010/0014552 A1    Jan. 21, 2010

(30) Foreign Application Priority Data

Jul. 17, 2008 (JP) ................................. 2008-186088
Jun. 29, 2009 (JP) ................................. 2009-154221

(51) Int. Cl.
*H01S 3/03* (2006.01)
(52) U.S. Cl. ................. 372/65; 372/61; 372/57; 372/55
(58) Field of Classification Search .................... 372/65, 372/61, 57, 55
See application file for complete search history.

(56) References Cited

U.S. PATENT DOCUMENTS 5,353,297 A * 10/1994 Koop et al. ...................... 372/64
2003/0193985 A1* 10/2003 Hara et al. ..................... 372/109

FOREIGN PATENT DOCUMENTS

| EP | 0527338 A1 | 2/1993 |
| JP | 63241975 A * | 10/1988 |
| JP | 0128878 A | 1/1989 |
| JP | 2-73679 A | 3/1990 |
| JP | 4-219988 A | 8/1992 |
| JP | 7058377 A | 3/1995 |
| JP | 2001-326403 A | 11/2001 |
| JP | 2003-304015 A | 10/2003 |
| JP | 3614450 B2 | 1/2005 |

OTHER PUBLICATIONS

Notice of Reasons for Rejection of Japanese Application No. 2009-154221 mailed Mar. 16, 2010.
Office Action from corresponding German Patent Application No. 10 2009 033 590.0-54, dated Oct. 4, 2010.

* cited by examiner

*Primary Examiner* — Kinam Park
(74) *Attorney, Agent, or Firm* — Lowe Hauptman Ham & Berner LLP

(57) ABSTRACT

A gas laser oscillator includes a plurality of discharge tube arrays, each discharge tube array including a plurality of electrical discharge tubes, a support mechanism supporting the plurality of discharge tube arrays, and an optical part optically connecting the plurality of discharge tube arrays. The support mechanism includes a discharge tube linking holder and an elastic member. The elastic member joins the discharge tube linking holder to a first support rod arranged at an upper side as seen in a direction of gravity.

4 Claims, 6 Drawing Sheets

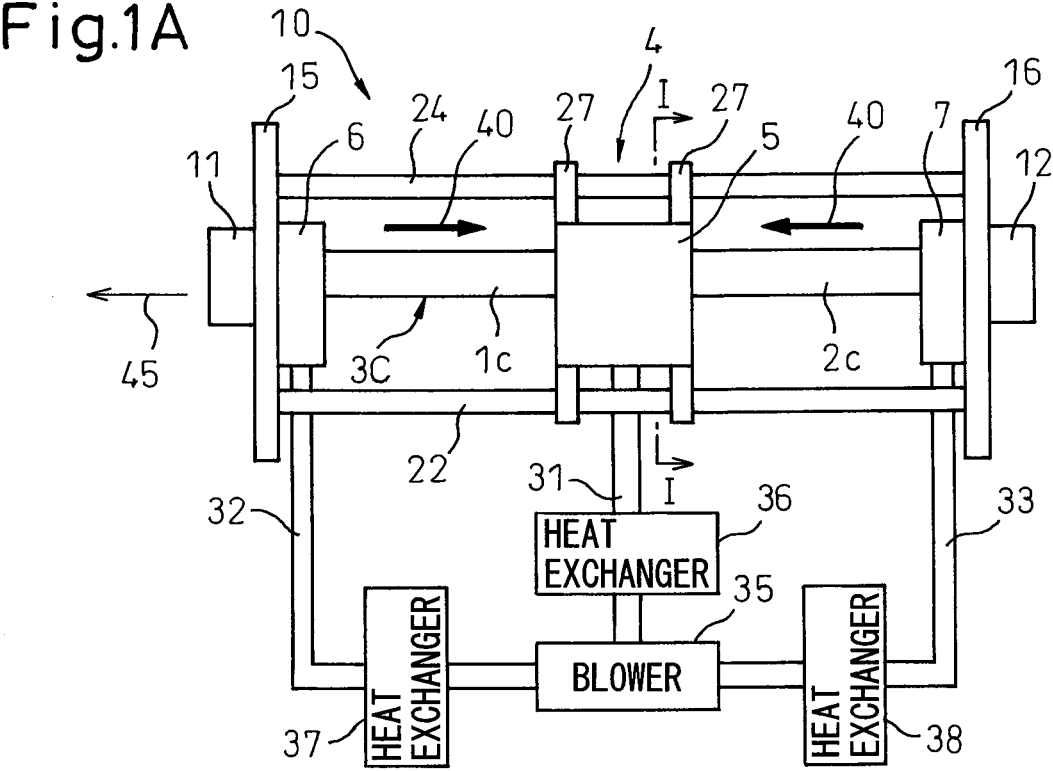
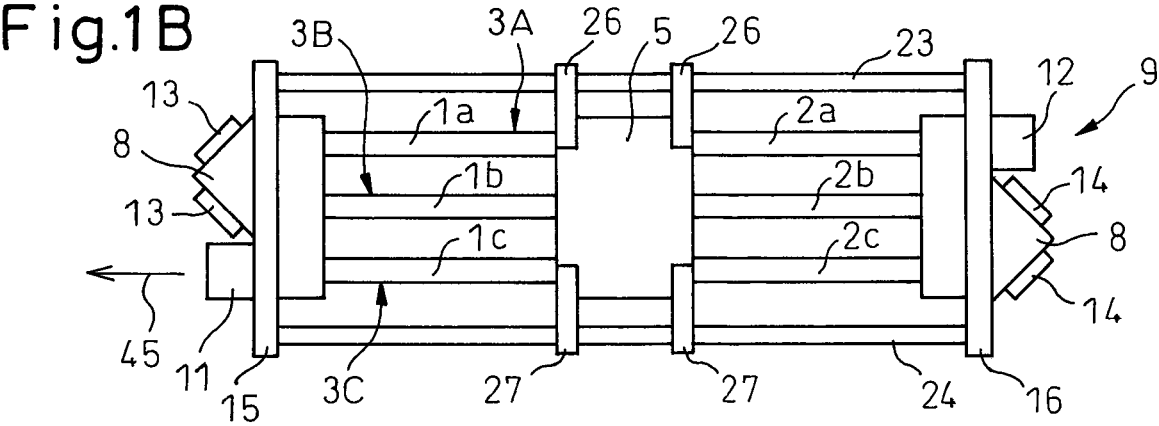
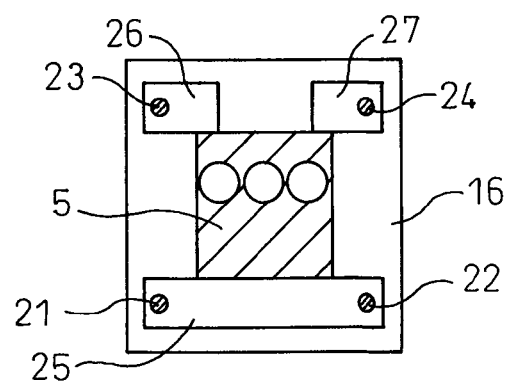

GAS LASER OSCILLATOR

RELATED APPLICATIONS

The present application is based on, and claims priority from, Japanese Application Number 2008-186088 filed Jul. 17, 2008, and Japanese Application Number 2009-154221 filed Jun. 29, 2009, the disclosures of which are hereby incorporated by reference herein in their entirety.

BACKGROUND OF THE INVENTION

1. Field of the Invention

The present invention relates to a gas laser oscillator that generates a laser beam by exciting laser gas introduced into an electrical discharge tube through an electric discharge.

2. Description of the Related Art

A gas laser oscillator (or a gas laser cavity) for, e.g., a carbon dioxide laser, provides a high power laser beam having good beam characteristics at high efficiency, and thus can be advantageously used for precise laser beam processing. Recently, a gas laser oscillator has been widely used in a laser processing machine capable of machining a workpiece into a complicated shape at high speed, while being combined with a numerical control unit for controlling the irradiation position of a generated beam on a workpiece.

FIGS. 7A and 7B schematically show the general configuration of a conventional gas laser oscillator (a configuration similar to the illustrated gas laser oscillator is described in Japanese Patent No. 3614450 (JP-B-3614450)). The illustrated gas laser oscillator is, e.g., a carbon dioxide gas laser oscillator and includes, as shown in FIG. 7A, two electrical discharge tubes 151, 152, into which laser gas is supplied, provided with electrodes (not shown) for causing an electric discharge in the supplied laser gas. The discharge tubes 151, 152 are mutually linked through a discharge tube linking holder 155 with their axes linearly aligned with each other.

An end plate 165 provided with an output mirror 161 is attached through a discharge tube holder 156 to the end of one discharge tube 151 opposite of the discharge tube linking holder 155. Similarly, an endplate 166 provided with a rear mirror 162 is attached through a discharge tube holder 157 to the end of another discharge tube 152 opposite of the discharge tube linking holder 155.

Thus, a Fabry-Perot type resonator, in which the output mirror 161 and the rear mirror 162 are disposed to face each other, is constituted. In order to dispose the output and rear mirrors 161, 162 so as to mutually face in high precision, i.e., to ensure good alignment of the optical axes thereof, the end plates 165, 166 are interconnected to each other through a support rod 170. The support rod 170 is made of an Invar alloy having a small coefficient of thermal expansion in order to prevent the optical axes of output and rear mirrors 161, 162 from being deviated from each other due to change in ambient air temperature or an increase in the internal temperature of the laser oscillator.

The discharge tube linking holder 155 mutually linking the discharge tubes 151, 152 is secured to the support rod 170 through a holder clamp 175 formed integrally with the holder 155 and forcibly cooled by, e.g., water cooling. Laser gas flows in a direction shown by an arrow in the drawing. The temperature of the discharge tube linking holder 155 rises due to flow of the laser gas heated by electric discharge, while the holder clamp 175 is forcibly cooled. Therefore, it is possible to prevent positional deviation of the discharge tube linking holder 155 relative to the support rod 170, and thus to eliminate an influence on the alignment of the optical axes of output and rear mirrors 161, 162 due to the positional deviation of discharge tube linking holder 155.

FIG. 7B shows a high power laser oscillator having the above basic configuration. In the illustrated high power laser oscillator, a plurality of discharge tube arrays 153A, 153B, 153C, each including a pair of electrical discharge tubes 151a, 152a, 151b, 152b, 151c, 152c, are arranged parallel to each other, the output mirror 161 and the rear mirror 162 are respectively disposed at the ends of discharge tube arrays 153A, 153C located at lateral ends of the parallel arrangement, and returning mirrors 163, 164 are disposed between the respective ends of discharge tube arrays 153A, 153B, 153C arranged in parallel. In this configuration, the optical axis of laser beam is turned back in multiple stages, and thereby all discharge tubes 151a, 152a, 151b, 152b, 151c, 152c are optically connected in series. The pair of electrical discharge tubes 151a, 152a, 151b, 152b, 151c, 152c of each discharge tube array 153A, 153B, 153C are mutually linked through the discharge tube linking holder 155 common to all discharge tube arrays 153A, 153B, 153C, and the discharge tube linking holder 155 is secured to the support rod 170 through the holder clamp 175.

In the above prior art, consideration is given so as to prevent the positional deviation of the discharge tube linking holder relative to the support rod due to the temperature rise of the gas laser oscillator associated with electric discharge, and thus to eliminate an influence on the alignment of the optical axes of the output and rear mirrors. However, especially in a high power laser oscillator including a plurality of discharge tube arrays, consideration is not sufficiently given to an influence on the optical axis alignment of the output and rear mirrors due to the thermal deformation of the discharge tube linking holder caused in association with electric discharge, or to the positional deviation of the discharge tube linking holder due to acceleration applied to the gas laser oscillator when the gas laser oscillator is physically displaced.

SUMMARY OF THE INVENTION

It is an object of the present invention to provide a gas laser oscillator (or a gas laser cavity) including a plurality of discharge tube arrays, capable of considering a thermal deformation of a discharge tube linking holder mutually linking a plurality of electrical discharge tubes of each discharge tube array and acceleration applied to the discharge tube linking holder when the gas laser oscillator is displaced, and thus improving the reliability of optical axis alignment of output and rear mirrors, as well as stability of output power of a laser beam.

The present invention provides a gas laser oscillator comprising a plurality of discharge tube arrays, each discharge tube array including a plurality of electrical discharge tubes aligning in an axial direction thereof; a support mechanism supporting the plurality of discharge tube arrays with axes of the discharge tube arrays extending in directions parallel to or intersecting with each other; and an optical part optically connecting the plurality of discharge tube arrays to each other with all of the plurality of electrical discharge tubes of the discharge tube arrays being arranged optically in series; the optical part comprising an output mirror and a rear mirror, disposed at respective one ends of a pair of electrical discharge tubes located at opposite ends of an optically serial arrangement of all of the plurality of electrical discharge tubes of the discharge tube arrays supported by the support mechanism; and a returning mirror disposed at an optical connection between the discharge tube arrays supported by the support mechanism; the support mechanism comprising a discharge tube linking holder mutually linking and supporting the plurality of electrical discharge tubes of each discharge tube array with the electrical discharge tubes aligning in the axial direction; a pair of end plates disposed at axially opposite ends of each discharge tube array, the end plates supporting the plurality of discharge tube arrays with the axes extending in directions parallel to or intersecting each other; a support rod fixed at opposite ends thereof to and extending between the pair of end plates; and an elastic member joining the discharge tube linking holder to the support rod.

According to the above configuration, since the discharge tube linking holder is joined to the support rod through the elastic member, it is possible to suppress the positional deviation of the discharge tube linking holder due to inertia, which may occur when acceleration is applied to the gas laser oscillator, by the elastic restoring force of the elastic member. Also, at a time when the discharge tube linking holder is thermally expanded by heat generating in association with an electric discharge in the electrical discharge tubes, it is possible to absorb the deformation of the discharge tube linking holder due to the thermal expansion by the elastic deformation of the elastic member. Thus, it is possible to prevent the support rod from being subjected to strain or positional deviation.

In the above configuration, in order to maintain the optical axis alignment of the output mirror and the rear mirror, the support mechanism may include a plurality of support rods extending between the pair of end plates. In this arrangement, the support mechanism may include the elastic member joining the discharge tube linking holder to a first support rod, and a rigid member securing the discharge tube linking holder to a second support rod different from the first support rod. According to this arrangement, when acceleration is applied to the gas laser oscillator, it is possible to stably hold the discharge tube linking holder at a position relative to the support rod by the securing function of the rigid member, and thus effectively suppress the positional deviation of the discharge tube linking holder due to inertia. On the other hand, since the discharge tube linking holder is joined through the elastic member to the second support rod, it is possible to effectively absorb the thermal expansion of the discharge tube linking holder by the deformation of the elastic member when the laser beam is produced, and thus prevent the support rod from being subjected to strain or positional deviation that may occur due to the thermal expansion of the discharge tube linking holder.

A spring or a sheet metal may be used as the elastic member.

Usually, a gas laser oscillator is provided with a circulating system for circulating laser gas through the electrical discharge tubes. In a configuration in which a plurality of discharge tube linking holders are provided, the circulating system may be configured such that laser gas is supplied through at least one first discharge tube linking holder to the discharge tube arrays, and is extracted through at least one second discharge tube linking holder from the discharge tube arrays. In this arrangement, the laser gas is heated by the electric discharge in the electrical discharge tubes and the high temperature laser gas is thus extracted from the discharge tube arrays, and therefore, the second discharge tube linking holder disposed at a location at which the laser gas is extracted is heated, while the first discharge tube linking holder disposed at a location at which the laser gas is supplied is not significantly heated. Thus, in this arrangement, the support mechanism may have a configuration wherein the second discharge tube linking holder is joined through the elastic member to the support rod, so as to permit the thermal expansion of the discharge tube linking holder due to heat to be absorbed by the elastic member. On the other hand, the first discharge tube linking holder is subjected to little thermal expansion, and thus is not necessarily joined through the elastic member to the support rod, but rather may be fixed through the rigid member to the support rod in order to enhance the effect of suppressing the positional deviation of the discharge tube linking holder due to the acceleration applied to the gas laser oscillator.

BRIEF DESCRIPTION OF THE DRAWINGS

The above and other objects, features and advantages of the present invention will become more apparent from the following description of preferred embodiments in connection with the accompanying drawings, wherein:

FIG. 1A is a schematic front view showing a gas laser oscillator according to an embodiment of the present invention;

FIG. 1B is a schematic plan view of the gas laser oscillator shown in FIG. 1A;

FIG. 1C is a schematic sectional view taken along a line I-I of the gas laser oscillator shown in FIG. 1A;

DETAILED DESCRIPTION

Figure 2A:
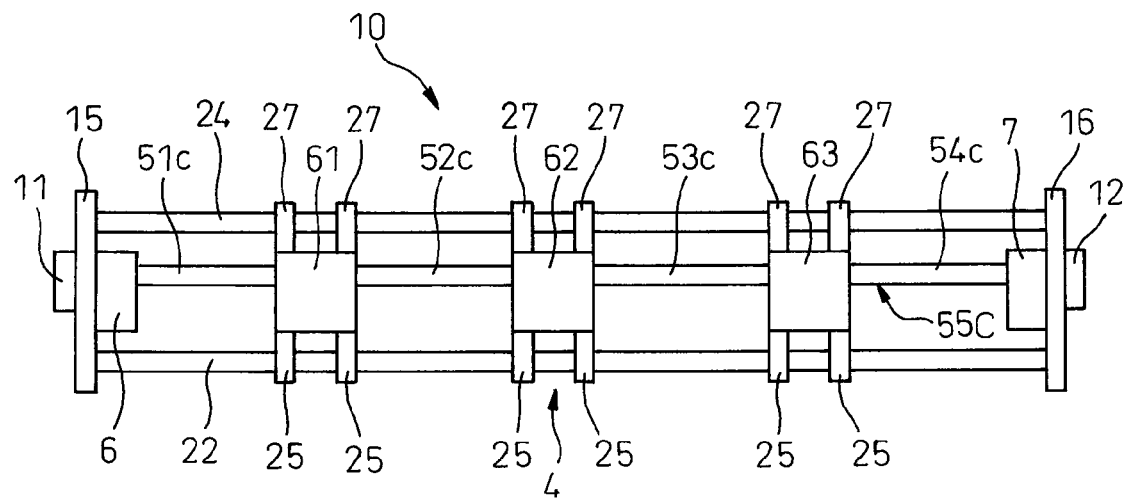
FIG. 2A is a schematic front view showing a modification of the gas laser oscillator.

The embodiments of the present invention are described below, in detail, with reference to the accompanying drawings. In the drawings, same or similar components are denoted by common reference numerals.

Referring to the drawings, FIGS. 1A to 1C are a schematic front view, a schematic plan view and a schematic sectional view taken along a line I-I, respectively, showing a gas laser oscillator (or a gas laser cavity) 10 according to an embodiment of the present invention (hereinafter referred simply to as a laser oscillator 10).

The laser oscillator 10 of the illustrated embodiment includes a plurality of (three, in the drawing) discharge tube arrays 3A, 3B, 3C, each including a plurality (a pair, in the drawing) of electrical discharge tubes 1a, 2a, 1b, 2b, 1c, 2c aligning in an axial direction thereof; a support mechanism 4 supporting the discharge tube arrays 3A, 3B, 3C with axes of the discharge tube arrays 3A, 3B, 3C extending in directions parallel to each other; and an optical part 9 optically connecting the discharge tube arrays 3A, 3B, 3C to each other with all of the electrical discharge tubes 1a, 2a, 1b, 2b, 1c, 2c of the discharge tube arrays 3A, 3B, 3C being arranged optically in series.

The pair of electrical discharge tubes 1a, 2a, 1b, 2b, 1c, 2c of each discharge tube array 3A, 3B, 3C are mutually linked, with the axes thereof arranged in a linear array, through a discharge tube linking holder 5 (one component of the support mechanism 4) commonly provided for three discharge tube arrays 3A, 3B, 3C. The discharge tube linking holder 5 is provided with a hollow interior space and thus forms a vacuum chamber. The interior space of the pair of electrical discharge tubes 1a, 2a, 1b, 2b, 1c, 2c of each discharge tube array 3A, 3B, 3C are axially communicated with each other through the discharge tube linking holder 5, and thereby light is permitted to propagate between the pair of electrical discharge tubes in an axial direction.

An end plate 15 (one component of the support mechanism 4) is attached through a common discharge tube holder 6 to an end of one electrical discharge tube 1a, 1b, 1c in each discharge tube array 3A, 3B, 3C, at a side opposite to the discharge tube linking holder 5. An end plate 16 (one component of the support mechanism 4) is attached through a common discharge tube holder 7 to an end of the other electrical discharge tube 2a, 2b, 2c in each discharge tube array 3A, 3B, 3C, at a side opposite to the discharge tube linking holder 5. Each of the discharge tube holders 6, 7 forms a vacuum chamber similar to the discharge tube linking holder 5. The end plates 15, 16 are disposed at axially opposite ends of each discharge tube array 3A, 3B, 3C, and support the discharge tube arrays 3A, 3B, 3C through the discharge tube holders 6, 7 with the axes of the discharge tube arrays extending in directions parallel to each other.

The optical part 9 includes an output mirror 11 and a rear mirror 12, disposed at respective one ends of a pair of electrical discharge tubes 1c, 2a located at opposite ends of an optically serial arrangement of all of the electrical discharge tubes 1a, 2a, 1b, 2b, 1c, 2c of the discharge tube arrays 3A, 3B, 3C supported by the support mechanism 4; and returning mirrors 13, 14 disposed at optical connections 8 between the discharge tube arrays 3A, 3B, 3C supported by the support mechanism 4. In the illustrated configuration, the end plate 15 is provided with a set of returning mirrors 13 and the output mirror 11, respectively located on the axis of the electrical discharge tubes 1a, 1b, 1c and facing one ends of the electrical discharge tubes 1a, 1b, 1c. The end plate 16 is provided with the rear mirror 12 and a set of returning mirrors 14, respectively located on the axes of the electrical discharge tubes 2a, 2b, 2c and facing one ends of the electrical discharge tubes 2a, 2b, 2c. In this manner, a Fabry-Perot type resonator, in which the output mirror 11 and the rear mirror 12 are disposed at the opposite ends of a light generating section formed by all of the electrical discharge tubes 1a, 2a, 1b, 2b, 1c, 2c of the discharge tube arrays 3A, 3B, 3C so as to face each other, is constituted. A half-mirror is used as the output mirror 11 in order to extract laser beam. A total-reflection mirror may be used as the rear mirror 12.

The pair of end plates 15, 16 are interconnected to each other through four support rods 21, 22, 23, 24 (one component of the support mechanism 4) extending parallel to the discharge tube arrays 3A, 3B, 3C. Each support rod 21, 22, 23, 24 is fixed at opposite ends thereof to and extending between the pair of end plates 15, 16. As shown in FIG. 1C, the end plates 15, 16 have a rectangular cross sectional shape in a plane perpendicular to the axes of the discharge tube arrays 3A, 3B, 3C (i.e., the major optical axis of the laser oscillator 10), four support rods 21-24 are disposed near the four corners of the rectangular shape, respectively. Since the end plates 15, 16 are fixed to each other through the support rods 21-24, the output mirror 11 and the rear mirror 12 are disposed so as to mutually face in high precision and to ensure that their optical axes are exactly aligned. Thus, the laser oscillator 10 is configured, by four support rods 21-24 and two end plates 15, 16, to form a box shape accommodating the discharge tube arrays 3A, 3B, 3C (the electrical discharge tubes 1a, 2a, 1b, 2b, 1c, 2c), the discharge tube holders 6, 7 and the discharge tube linking holder 5.

It is preferred that the support rods 21-24 are made of Invar alloy having a small coefficient of thermal expansion in order to prevent the optical axes of the output mirror 11 and the rear mirror 12 from being deviated from each other due to a change in ambient air temperature or an increase in the internal temperature of the laser oscillator. Other materials may be used as the material of support rods 21-24, provided that the materials possess, in an ordinary operating temperature range, a sufficiently small coefficient of thermal expansion and an acceptable amount of thermal deformation.

The discharge tube linking holder 5 is joined through clamps 25, 26, 27 to the support rods 21-24. In the illustrated configuration, the discharge tube linking holder 5 is joined to two support rods 21, 22, arranged at a lower side as seen in the direction of gravity, through a common (single) clamp (i.e., a rigid member) 25 formed from a rigid material. On the other hand, the discharge tube linking holder 5 is joined to the other two support rods 23, 24, arranged at an upper side as seen in the direction of gravity, through separate (two) clamps (i.e., elastic members) 26, 27 formed from an elastic material, respectively. Respective pair of clamps 25, 26, 27 are disposed one by one at opposite end regions of the discharge tube linking holder 5 in the direction of the optical axis. The rigid material usable for the clamp 25 is, e.g., aluminum alloy, etc. On the other hand, the elastic material usable for each of the clamps 26, 27 is, e.g., spring steel, etc., but a clump having a composite construction as described later is preferably used.

As shown in FIG. 1A, a circulation system of laser gas is connected to the interior space of the discharge tube linking holder 5 and the discharge tube holders 6, 7. Pipe lines 31, 32, 33 extend from the discharge tube linking holder 5 and the discharge tube holder 6, 7, respectively, and are connected to a blower 35. The blower 35 is, e.g., a turbo blower, and is constructed to forcibly feed the laser gas from the suction-side pipe line 31 to the discharge-side pipe lines 32, 33. Thus, the laser gas flows in all of the electrical discharge tubes 1a, 2a, 1b, 2b, 1c, 2c of the discharge tube arrays 3A, 3B, 3C, from the discharge tube holder 6, 7 adjacent to the end plates 15, 16 toward the center, discharge tube linking holder 5, as shown schematically by an arrow 40. Heat exchangers 36, 37, 38 for cooling the laser gas are respectively provided in laser gas passages formed by the pipe lines 31, 32, 33.

Although not shown in the drawing, electrodes are arranged on each discharge tube array 3A, 3B, 3C in order to cause electric discharge in the laser gas and to thereby excite the laser gas, and a high frequency power source is connected to the electrodes. The laser oscillator 10 is fixed to a frame (not shown) through bearings (not shown) at two points on one end and at one point on another end (total of three points).

In the illustrated laser oscillator 10, high frequency electric discharge is caused in all of the electrical discharge tubes 1a, 2a, 1b, 2b, 1c, 2c of the discharge tube arrays 3A, 3B, 3C, in a condition where the laser gas flows through the electrical discharge tubes 1a, 2a, 1b, 2b, 1c, 2c, in a direction shown by an arrow 40, by the operation of the blower 35. The laser gas is thereby excited to emit light, the emitted light is amplified by resonance that occurs between the output mirror 11 and the rear mirror 12, and laser beam having desired intensity is extracted from the output mirror 11, as shown schematically by an arrow 45.

During a time when the laser beam is produced, the laser gas is heated by the electric discharge in the electrical discharge tubes 1a, 2a, 1b, 2b, 1c, 2c of the discharge tube arrays 3A, 3B, 3C. The heated laser gas is delivered through the discharge tube linking holder 5 to the pipe line 31, is cooled by the heat exchanger 36 disposed in the passage formed by the pipe line 31, and thereafter enters into the blower 35. The laser gas fed out from the blower 35 is deprived of the compression heat thereof by the heat exchangers 37, 38 disposed in the passage formed by the pipe lines 32, 33, so as to be adjusted to a predetermined temperature, and is fed into the discharge tube holders 6, 7.

Although not shown in the drawing, the laser oscillator 10 may include a controller for controlling electric power supplied to the blower 35, the heat exchangers 36-38 and the electrical discharge tubes 1a, 2a, 1b, 2b, 1c, 2c of the discharge tube arrays 3A, 3B, 3C, based on, e.g., a desired laser output power, etc. The output power of the laser oscillator 10 can be advantageously used for a laser beam processing of a workpiece. In this case, the laser oscillator 10 is incorporated into a laser processing machine (not shown), wherein the laser beam output from the laser oscillator 10 is turned in desired directions by a bender mirror of the laser processing machine to be introduced into a laser processing section, and is applied onto the workpiece. At this time, in order to irradiate a desired position on the workpiece with the laser beam, the position and orientation of the workpiece, the bender mirror and/or the laser oscillator are adjusted by an actuator as required. Such an adjustment can be accomplished, as is well known, by using a numerical control unit. The numerical control unit may cooperate with the controller of the laser oscillator 10, or alternatively, the controller of the laser oscillator 10 may be configured as a part of the numerical control unit.

In the illustrated laser oscillator 10, the discharge tube linking holder 5 is joined to and supported by four support rods 21-24 positioned at the four corners of the discharge tube linking holder 5, through the clamp (or rigid member) 25 and the clamps (or elastic member) 26, 27. Therefore, when the laser oscillator 10 is moved, e.g., by the above-described actuator or for the purpose of an installation to desired equipment, it is possible to prevent the discharge tube linking holder 5 from being subjected to a positional deviation due to acceleration applied to the discharge tube linking holder 5. More specifically, when the acceleration is applied to the discharge tube linking holder 5, the clamp (or rigid member) 25 mainly acts to stably retain the discharge tube linking holder 5 at a regular position relative to the support rods 21-24. At this time, the clamps (or elastic members) 26, 27 allows the slight displacement of the discharge tube linking holder 5 due to inertia, but acts to quickly reposition the discharge tube linking holder 5 at the regular position by an elastic restoring force. Further, in the illustrated configuration wherein the discharge tube linking holder 5 is supported at the four corners by the support rods 21-24, it is possible to effectively prevent a positional deviation of the discharge tube linking holder 5, such as a tilting thereof about a supporting point, which may tend to be caused if the supporting point is set at an unbalanced location. Consequently, in the laser oscillator 10, it is possible to prevent respective beam-shaped components, such as the support rods 21-24, the electrical discharge tubes 1a, 2a, 1b, 2b, 1c, 2c, etc., from being subjected to strain due to the positional deviation of the discharge tube linking holder 5 caused by acceleration applied thereto, to suppress a positional deviation (an inclination, etc.) between the end plates 15, 16, which tends to be caused due to the strain in the beam-shaped components, thus to prevent the optical axes of the output mirror 11 and the rear mirror 12 from being misaligned, and thereby to ensure the stability of the laser beam output power.

On the other hand, as described above, the discharge tube linking holder 5 experiences a thermal expansion with time from the start of producing a laser beam, due to a contact with the laser gas heated by the electric discharge in the discharge tube arrays 3A, 3B, 3C. In the illustrated laser oscillator 10, among the clamps 25, 26, 27 joining the discharge tube linking holder 5 to the support rods 21-24, upper two clamps 26, 27 are formed by using an elastic material. Therefore, the thermal expansion of the discharge tube linking holder 5, at a time when the laser beam is produced, can be absorbed by the elastic deformation (or elastic contraction) of the clamps (or elastic members) 26, 27, and thus is not transmitted to the support rod 21-24. Consequently, in the laser oscillator 10, it is possible to prevent respective beam-shaped components, such as the support rods 21-24, the electrical discharge tubes 1a, 2a, 1b, 2b, 1c, 2c, etc., from being subjected to strain due to the thermal deformation of the discharge tube linking holder 5, to suppress a positional deviation (an inclination, etc.) between the end plates 15, 16, which tends to be caused due to the strain in the beam-shaped components, thus to prevent the optical axes of the output mirror 11 and the rear mirror 12 from being misaligned, and thereby to ensure the stability of the laser beam output power.

The illustrated configuration, in which the discharge tube linking holder 5 is secured through the clamp (or rigid member) 25 formed from a rigid material to the lower two support rods 21, 22 while is joined through the clamps (or elastic members) 26, 27 formed from an elastic material to the upper two support rods 23, 24, is particularly suitable to a configuration wherein a vertical spacing of the support rods 21-24 (i.e., a distance between support rods 21, 23, or between support rods 22, 24) is longer than a horizontal spacing of the support rods 21-24 (i.e., a distance between support rods 21, 22, or between support rods 23, 24). In this configuration, the influence of the thermal expansion of the discharge tube linking holder 5 is more likely to be exerted in a vertical direction in which the rod spacing is longer, and therefore, the strain of each support rod 21-24 tends to emerge in the form of an inclination of the pair of end plates 15, 16 in relation to the vertical direction (i.e., a rotation about a horizontal axis). Thus, according to the configuration wherein the top end region of the discharge tube linking holder 5, which is less affected by a gravity, is joined through the clamps (or elastic members) 26, 27 formed from an elastic material to the upper two support rods 23, 24, so as to permit the top end region to be displaced relative to the support rods 23, 24 when the discharge tube linking holder 5 thermally expands, it is possible to suppress the inclination of the end plates 15, 16 in relation to the vertical direction. As a result, it is possible to suppress change in parallelism between the end plates 11, 12, and thus to effectively prevent the misalignment of the optical axes of the output and rear mirrors 11, 12 from occurring.

As a member for joining the discharge tube linking holder 5 to each of the support rods 21-24, either the elastic member or the rigid member may be suitably selected for use, in accordance with the disposition or number of the support rods 21-24, the configuration of the discharge tube linking holder 5, etc. In this regard, in order to effectively suppress the positional deviation of the discharge tube linking holder 5 due to inertia when acceleration is applied to the laser oscillator 10 and the resultant strain subjected to the beam-shaped members, as well as the thermal expansion of the discharge tube linking holder 5 during a time when the laser beam is produced and the resultant strain subjected to the beam-shaped members, it is only necessary to join the discharge tube linking holder 5 to at least one of the support rods 21-24 through the elastic member. As already described, the positional deviation of the discharge tube linking holder 5 due to inertia is a temporary matter, the discharge tube linking holder 5 may be joined to all of the support rods through elastic members, regardless of the number of the support rods. In a configuration wherein a plurality of support rods are used as shown in the illustrated configuration, it is preferred that the rigid member is used to join the discharge tube linking holder 5 to at least one first support rod and the elastic member is used to join the discharge tube linking holder 5 to at least one second support rod, in order to improve reliability of the function for preventing the positional deviation of the discharge tube linking holder 5.

Figure 2B:
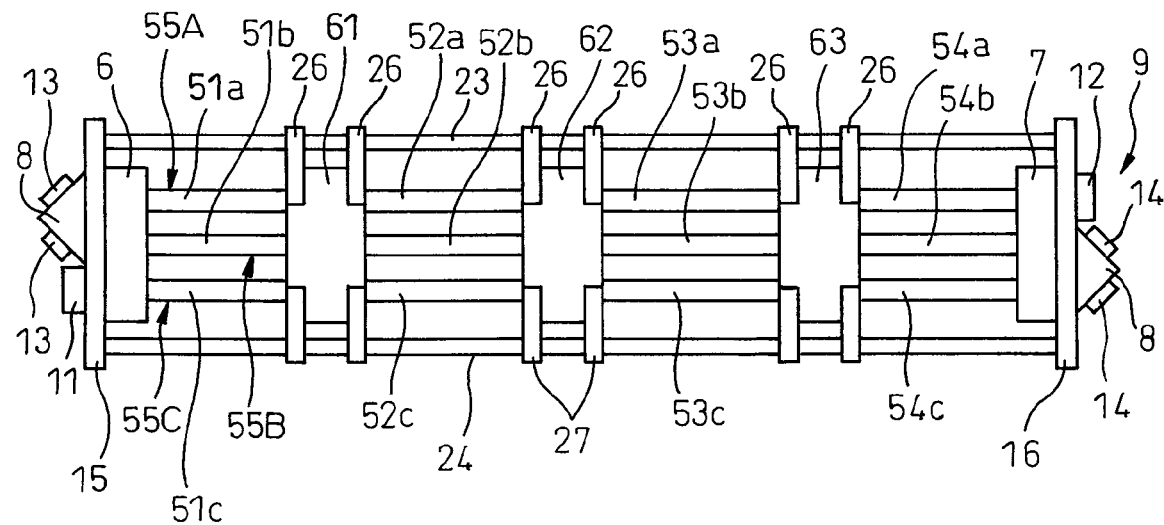
FIG. 2B is a schematic plan view of the gas laser oscillator shown in FIG. 2A.

FIGS. 2A and 2B show a modified configuration of the laser oscillator 10 of FIGS. 1A-1C, wherein each of three discharge tube arrays 55A, 55B, 55C includes four electrical discharge tubes 51*a*, 52*a*, 53*a*, 54*a*; 51*b*, 52*b*, 53*b*, 54*b*; 51*c*, 52*c*, 53*c*, 54*c*, aligning in the axial direction thereof. In this modification, four of a total of twelve electrical discharge tubes 51*a*-54*c* are mutually linked, with the axes thereof arranged in a linear array, through three discharge tube linking holders 61, 62, 63 commonly provided for three discharge tube arrays 55A, 55B, 55C. In the modification shown in FIGS. 2A-2B, components corresponding to those shown in FIGS. 1A-1C are denoted by reference numerals identical to those used in FIGS. 1A-1C, and detailed explanations thereof are not repeated.

In the configuration shown in FIGS. 2A and 2B, each of the discharge tube linking holders 61, 62, 63 is secured to the lower support rods 21, 22 through the clamp (or rigid member) 25 formed from a rigid material, and is joined to the upper support rods 23, 24 through the clamps (or elastic members) 26, 27 formed from an elastic material. According to this configuration, three discharge tube linking holders 61, 62, 63 can be held in a stable state by four support rods 21-24. More specifically, it is possible to suppress, when acceleration is applied to the laser oscillator 10, the positional deviation of each discharge tube linking holder 61, 62, 63 due to inertia, by the cooperation of the clamp (or rigid member) 25 and the clamps (or elastic members) 26, 27, and thus to prevent the optical axes of the output and rear mirrors 11, 12 from being misaligned, and also it is possible to absorb, when each discharge tube linking holder 61, 62, 63 thermally expands during a time when the laser beam is produced, the thermal expansion of each discharge tube linking holder 61, 62, 63, by the elastic deformation of the clamps (or elastic members) 26, 27, and thus to prevent the optical axes of the output and rear mirrors 11, 12 from being misaligned.

Figure 3:
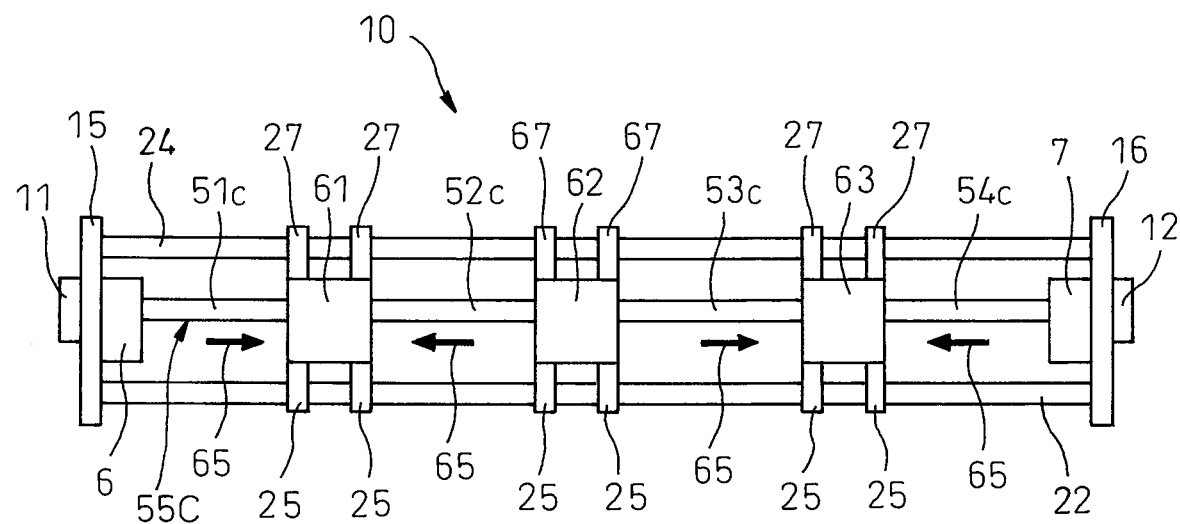
FIG. 3 is a schematic front view showing another modification of the gas laser oscillator.

In a configuration such as the above modification, which includes a plurality of discharge tube linking holders, if a discharge tube linking holder that is not significantly heated is included, such a non-heated discharge tube linking holder may be joined to the support rods using only the rigid member, without using the elastic member. FIG. 3 shows another modification of the laser oscillator 10 having such configuration. In the modification shown in FIG. 3, components corresponding to those shown in FIGS. 1A-1C, 2A and 2B are denoted by reference numerals identical to those used in FIGS. 1A-1C, 2A and 2B, and detailed explanations thereof are not repeated.

In the modification shown in FIG. 3, laser gas flows in a direction shown by an arrow 65 in three discharge tube arrays 55A, 55B, 55C (only the discharge tube array 55C is shown). More specifically, laser gas is supplied from the above-described circulation system to the discharge tube holders 6, 7 connected to the opposite end plates 15, 16 and also to the center discharge tube linking holder 62, respectively. The laser gas supplied to the holders 6, 7, 62 flows through the electrical discharge tubes 51*a*, 52*a*, 53*a*, 54*a*; 51*b*, 52*b*, 53*b*, 54*b*; 51*c*, 52*c*, 53*c*, 54*c* of the discharge tube arrays 55A, 55B, 55C towards the intermediate discharge tube linking holders 61, 63 located between the discharge tube linking holder 62 and the respective discharge tube holders 6, 7, and is extracted from the discharge tube linking holders 61, 63 to the circulation system.

In this connection, as already described, the laser gas is returned to the circulation system after being heated by the electric discharge in the discharge tube arrays 55A, 55B, 55C, and is supplied from the circulation system to the discharge tube holders 6, 7 and the discharge tube linking holder 62 after being cooled and adjusted to a predetermined temperature. Therefore, among three discharge tube linking holders 61-63, the center discharge tube linking holder 62 only receives the cooled laser gas from the circulation system and does not contact the laser gas heated in the electrical discharge tubes, so that the center discharge tube linking holder 62 is hardly heated.

Thus, in the configuration shown in FIG. 3, the center discharge tube linking holder 62 is secured through a clamp (or rigid member) 67 formed from a rigid material to the upper support rods 23, 24, in a manner similar to the clamp (or rigid member) 25 for the lower support rods 21, 22. The clamp 67 may have a configuration corresponding to the lower clamp 25. The discharge tube linking holder 62 is joined to and supported by the four support rods 21-24 through the clamps (rigid member) 25, 67 formed from a rigid material, and thereby is held in a more stable state than the configuration shown in FIGS. 2A and 2B, so that it is possible to effectively suppress the positional deviation of the discharge tube linking holder 62 when acceleration is applied to the laser oscillator 10. Furthermore, the center discharge tube linking holder 62 is little heated during a time when the laser beam is produced, so that it is also possible to prevent the misalignment of the optical axes of the output and rear mirrors 11, 12 from occurring due to the thermal expansion of the discharge tube linking holder 62.

On the other hand, in the configuration shown in FIG. 3, as for the intermediate discharge tube linking holders 61, 63, the clamp (or rigid member) 25 formed from a rigid material is used at a lower side and the clamps (or elastic members) 26, 27 formed from an elastic material are used at an upper side. Thus, as regards the discharge tube linking holders 61, 63, it is possible to effectively prevent the misalignment of the optical axes due to the positional deviation due to inertia when acceleration is applied and also the misalignment of the optical axes due to the thermal expansion during a time when the laser beam is produced.

In the configurations shown in FIGS. 1A to 3, the members for joining the discharge tube linking holders 5, 61-63 to the support rods 21-24 is not limited to the clamps 25, 26, 27 illustrated by way of examples as unitary members. In particular, the elastically deformable clamps (or elastic members) 26, 27 need not be formed entirely from an elastic material, but may be configured as to be at least partially elastically deformed so as to permit the top end portion of the discharge tube linking holder 5, 61-63 to be displaced (e.g., a configuration wherein an elastic member is partially arranged in a clamp unit interposed between the discharge tube linking holder 5, 61-63 and the support rods 21-24.

Figure 4:
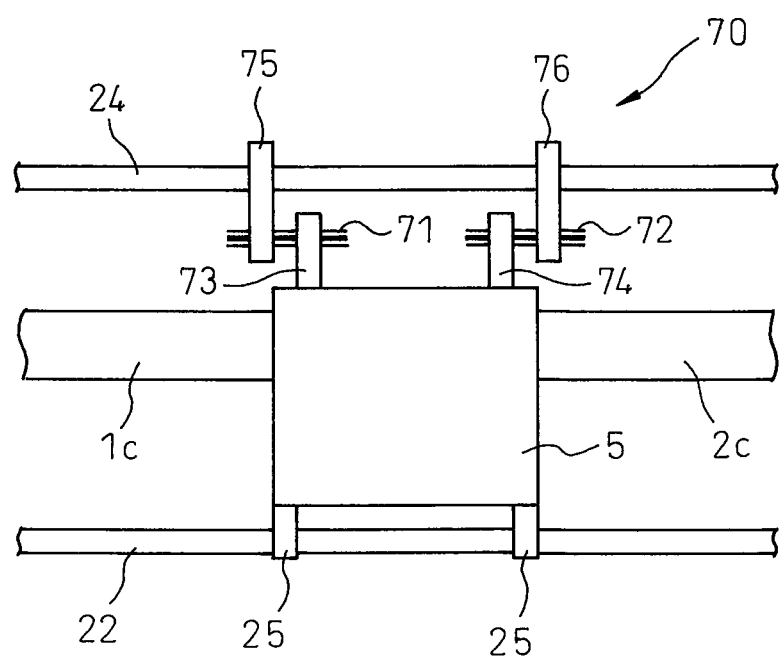
FIG. 4 is a schematic front view showing a support mechanism of a further modification of the gas laser oscillator.

As the above-described elastic member partially arranged in the clamp unit, a spring or a suitably-shaped sheet metal may be used. FIG. 4 shows a configuration of the modified support mechanism 4, which includes a clamp unit 70 using a spring (or an elastic member) at a part thereof. FIG. 4 only shows a periphery of the discharge tube linking holder 5, and the remaining portions of the gas laser oscillator may have a configuration corresponding to that shown in FIGS. 1A-1C. In the modification shown in FIG. 4, components corresponding to those shown in FIGS. 1A-1C are denoted by reference numerals identical to those used in FIGS. 1A-1C, and detailed explanations thereof are not repeated.

In the configuration shown in FIG. 4, the clamp unit 70 is provided in place of the above-described clamp 27, and has a configuration wherein protrusions 73, 74 are respectively formed on an top surface of the discharge tube linking holder 5 at mutually corresponding positions in opposite end regions of the holder 5 as seen in a laser optical axis direction, clamps 75, 76 are respectively attached to the upper support rod 24 at positions corresponding to the protrusions 73, 74, and the protrusions 73, 74 are respectively connected through springs (or elastic members) 71, 72 to the clamps 75, 76. Although not shown, a clamp unit configured similarly to the clamp unit 70 may also be provided, in place of the above-described clamp 26, between the top surface of the discharge tube linking holder 5 and the upper support rod 23. According to the configuration shown in FIG. 4, it is possible to absorb the thermal expansion of the discharge tube linking holder 5 in the vertical direction and the optical axis direction, by the elastic deformation of the springs 71, 72, and thus to prevent the optical axes of the output and rear mirrors 11, 12 from being misaligned.

Figure 5A:
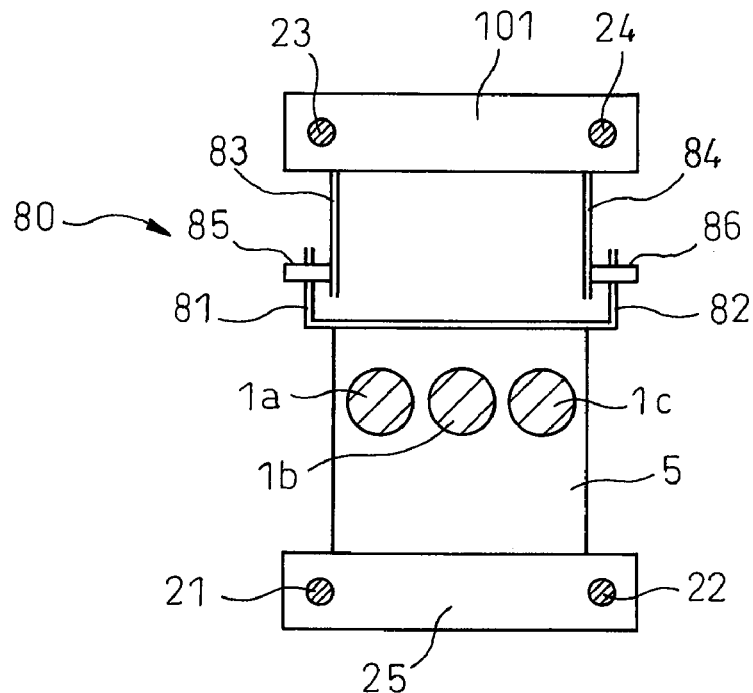
FIG. 5A is a schematic sectional view showing a support mechanism of a yet further modification of the gas laser oscillator.
Figure 5B:
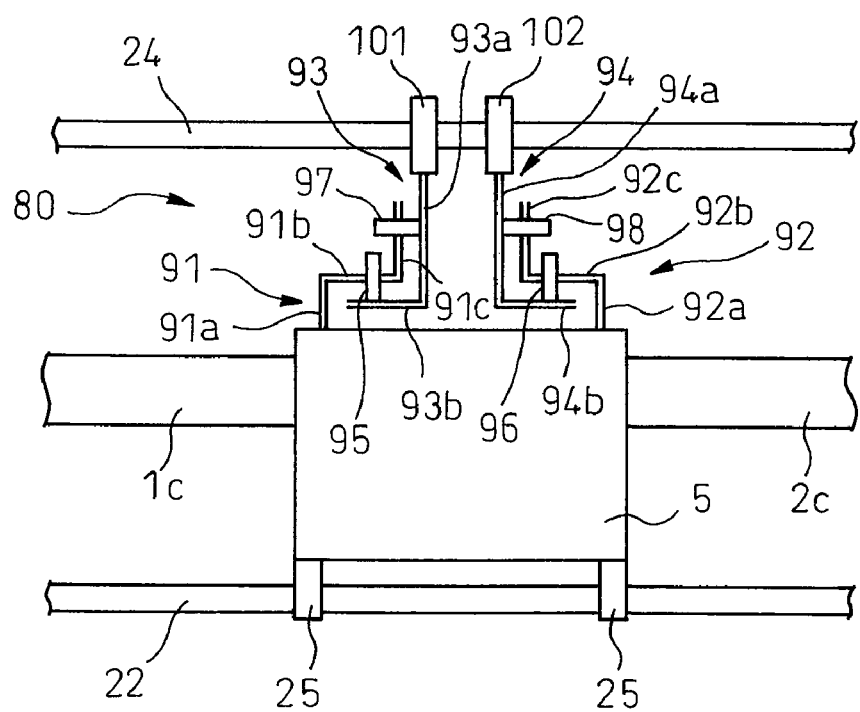
FIG. 5B is a schematic front view of the support mechanism shown in FIG. 5A.

FIGS. 5A and 5B show another configuration of the modified support mechanism 4, which includes a clamp unit 80 using a sheet metal (or an elastic member) at a part thereof; FIG. 5A is a partially sectional view showing the clamp unit 80 in a direction of the optical axis of the discharge tube linking holder 5, and FIG. 5B is a front view showing the clamp unit 80 in a direction orthogonal to the optical axis. In the modification shown in FIGS. 5A-5B, components corresponding to those shown in FIGS. 1A-1C are denoted by reference numerals identical to those used in FIGS. 1A-1C, and detailed explanations thereof are not repeated. Further, FIG. 5A does not show components such as sheet metals 91-94 that can be seen in FIG. 5B, while FIG. 5B does not show components such as sheet metals 81-84 that can be seen in FIG. 5A.

In the illustrated configuration, as shown in FIG. 5A, in order to permit the top end portion of the discharge tube linking holder 5 to be displaced in a horizontal (or perpendicular to the direction of gravity) direction that is also perpendicular to a laser optical axis (i.e., rightward and leftward direction in FIG. 5A), and also to ensure a supporting force in this direction, sheet metals 81-84 are used, each including an elastically deformable portion with a plate thickness thereof being oriented to the horizontal direction perpendicular to the laser optical axis. More specifically, the clamp unit 80 is provided in place of the above-described clamps 26, 27, and has a configuration wherein the sheet metals 81, 82 including upwardly extending elastically deformable portions are respectively fixed to the opposite end regions of the top surface of the discharge tube linking holder 5 as seen in a direction perpendicular to the laser optical axis, a single clamp 101 is secured to the upper support rods 23, 24, the sheet metals 83, 84 including downwardly extending elastically deformable portions are respectively fixed to the opposite end regions of the bottom surface of the clamp 101 as seen in a direction perpendicular to the laser optical axis, the sheet metal 81 is connected to the sheet metal 83 by a fastening screw 85, and the sheet metal 82 is connected to the sheet metal 84 by a fastening screw 86.

As shown in FIG. 5B, another clamp 102 similar to the clamp 101 is also attached to the support rods 23, 24 with the clamps being spaced from each other in the laser optical axis direction. As regards the clamp 102, in order to permit the top end portion of the discharge tube linking holder 5 to be displaced in the horizontal direction perpendicular to the laser optical axis and also to ensure a supporting force in this direction, sheet metals 81-84 may also be used to join the discharge tube linking holder 5 to the clamp 102.

Further in the illustrated clamp unit 80, as shown in FIG. 5B, in order to permit the top end portion of the discharge tube linking holder 5 to be displaced in a direction parallel to the laser optical axis (i.e., rightward and leftward direction in FIG. 5B), and also to ensure a supporting force in this direction, sheet metals 91-94 are used, each including an elastically deformable portion with a plate thickness thereof being oriented to the direction parallel to the laser optical axis. More specifically, the clamp unit 80 is provided in place of the above-described clamps 26, 27, and has a configuration wherein the sheet metals 91, 92 including upwardly extending elastically deformable portions are respectively fixed to the opposite end regions of the top surface of the discharge tube linking holder 5 as seen in a direction parallel to the laser optical axis, and the sheet metals 93, 94 including downwardly extending elastically deformable portions are respectively fixed to the bottom surfaces of the clamps 101, 102 secured to the upper support rods 23, 24.

The sheet metals 91-94 also serve to ensure supporting force in a vertical direction while permitting the top end portion of the discharge tube linking holder 5 to be displaced in the vertical direction. For this purpose, the sheet metals 91, 92 fixed to the discharge tube linking holder 5 have a crank-shaped bent configuration wherein elastically deformable portions 91b, 92b extending in the laser optical axis direction are joined to the top ends of portions 91a, 92a extending upward from the discharge tube linking holder 5, and elastically deformable portions 91c, 92c extending upward are joined to the other ends of portions 91b, 92b. On the other hand, the sheet metals 93, 94 fixed to the clamps 101, 102 have an L-shaped bent configuration wherein elastically deformable portions 93b, 94b extending in the laser optical axis direction are joined to the bottom ends of portions 93a, 94a extending downward from the clamps 101, 102. The elastically deformable portions 91b, 92b, extending in the laser optical axis direction, of the sheet metals 91, 92 fixed to the discharge tube linking holder 5 are respectively connected by fastening screws 95, 96 to the elastically deformable portions 93b, 94b, extending in the laser optical axis direction, of the sheet metals 93, 94 fixed to the clamps 101, 102; and the upwardly extending elastically deformable portions 91c, 92c of the sheet metals 91, 92 are respectively connected by fastening screws 97, 98 to the downwardly extending elastically deformable portions 93a, 94a.

The sheet metals 91-94 are disposed at a location capable of eliminating interference with the sheet metal 81-84 (e.g., at a center of each clamp 101, 102 (a location between upper two support rods 23, 24 in FIG. 5A)). In this configuration, a set of sheet metals 83, 84, 93 fixed to the clamp 101 may be formed from a unitary member, and a set of sheet metals 81, 82, 91 connected respectively thereto and fixed to the discharge tube linking holder 5 may be formed from another unitary member. Similarly, a set of sheet metals 83, 84, 94 fixed to the clamp 102 may be formed from a unitary member, and a set of sheet metals 81, 82, 92 connected respectively thereto and fixed to the discharge tube linking holder 5 may be formed from another unitary member.

According to the configuration shown in FIGS. 5A and 5B, it is possible to absorb the thermal expansion of the discharge tube linking holder 5 in the vertical direction, the optical axis direction and the direction orthogonal to the vertical and optical-axis directions, by the elastic deformation of the sheet metals 81-84, 91-94, and thus to prevent the optical axes of the output and rear mirrors 11, 12 from being misaligned. In this configuration, it is preferable that the clamp unit 80 is configured in such a manner that the sheet metals 81-84, 91-94 are suitably bent and pre-stressed when the discharge tube linking holder 5 is at normal temperature, and that the pre-stress applied to the sheet metals 81-84, 91-94 is reduced when the discharge tube linking holder 5 is thermally expanded. According to this configuration, it is possible to significantly reduce stress that may be applied to the support mechanism 4 during a normal operation of the gas laser oscillator.

The configuration of the gas laser oscillator according to the present invention is not limited to the above-described embodiments, but may be variously changed or modified within a technical scope defined by the attached claims. For example, the various number of discharge tube arrays included in the gas laser oscillator, or the various number of electrical discharge tubes included in each discharge tube array, other than the number shown in the drawings, may be adopted. FIGS. 6A to 6D show several modifications of the laser oscillator 10 of FIG. 1, including various types of discharge tube arrays. In the modification shown in FIGS. 6A-6D, components corresponding to those shown in FIGS. 1A-1C are denoted by reference numerals identical to those used in FIGS. 1A-1C, and detailed explanations thereof are not repeated.

Figure 6A:
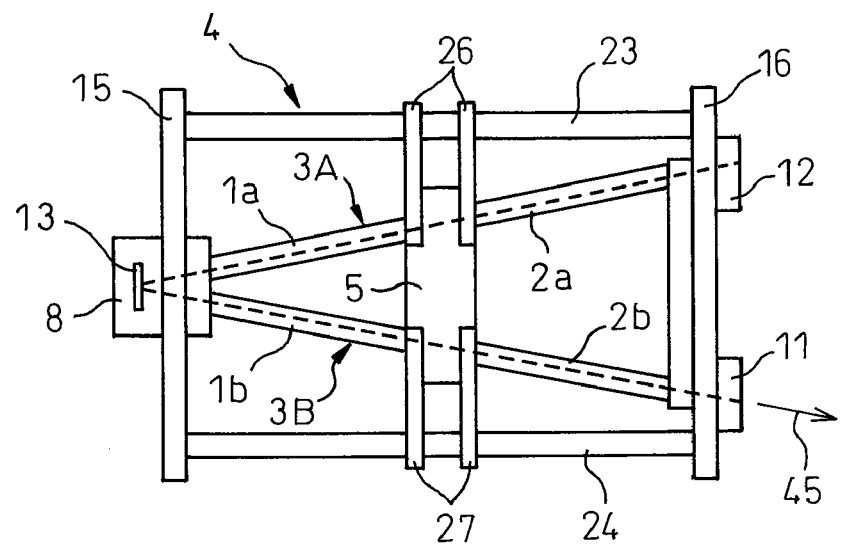
FIG. 6A is a schematic plan view showing a yet further modification of the gas laser oscillator, in which a single returning mirror is disposed at an optical connection between discharge tube arrays.
Figure 6B:
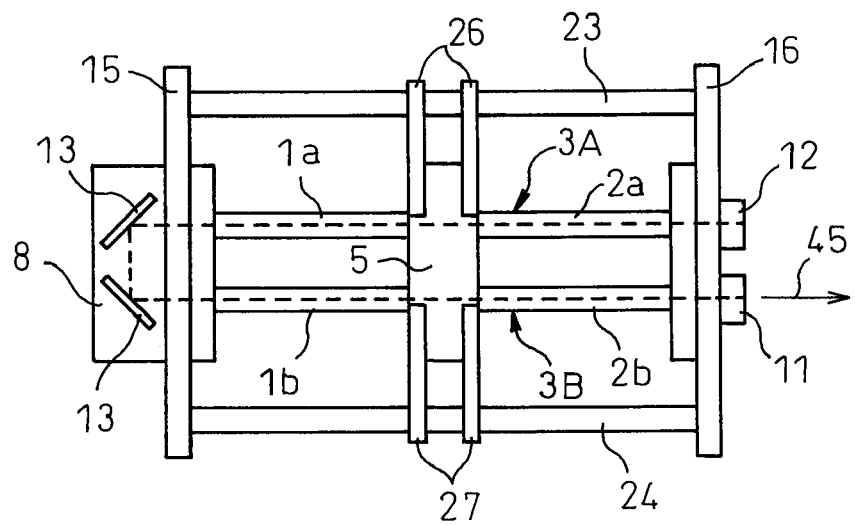
FIG. 6B is a schematic plan view of the gas laser oscillator shown in FIG. 6A, in which two returning mirrors are disposed.
Figure 6D:
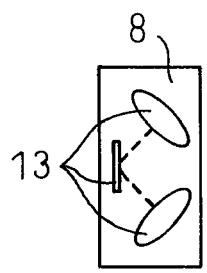
FIG. 6D is a schematic side view of the optical connection of the gas laser oscillator shown in FIG. 6C.
Figure 6C:
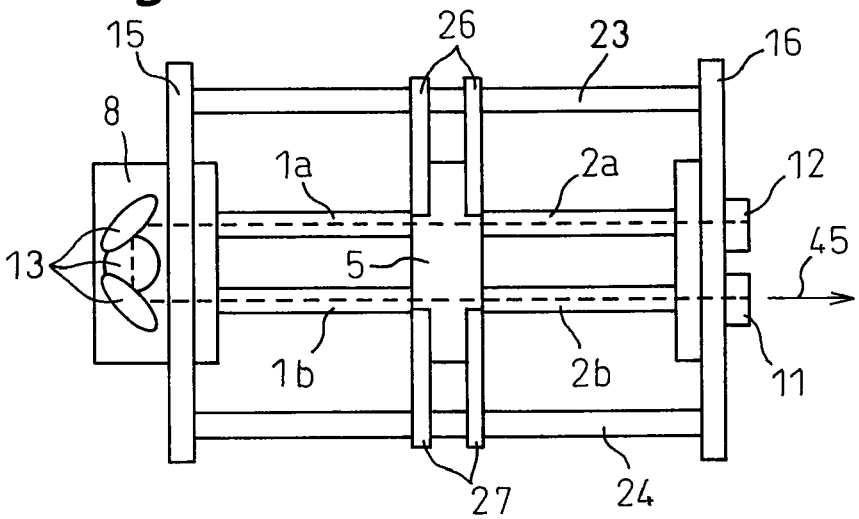
FIG. 6C is a schematic plan view of the gas laser oscillator shown in FIG. 6A, in which three returning mirrors are disposed.
Figure 7A:
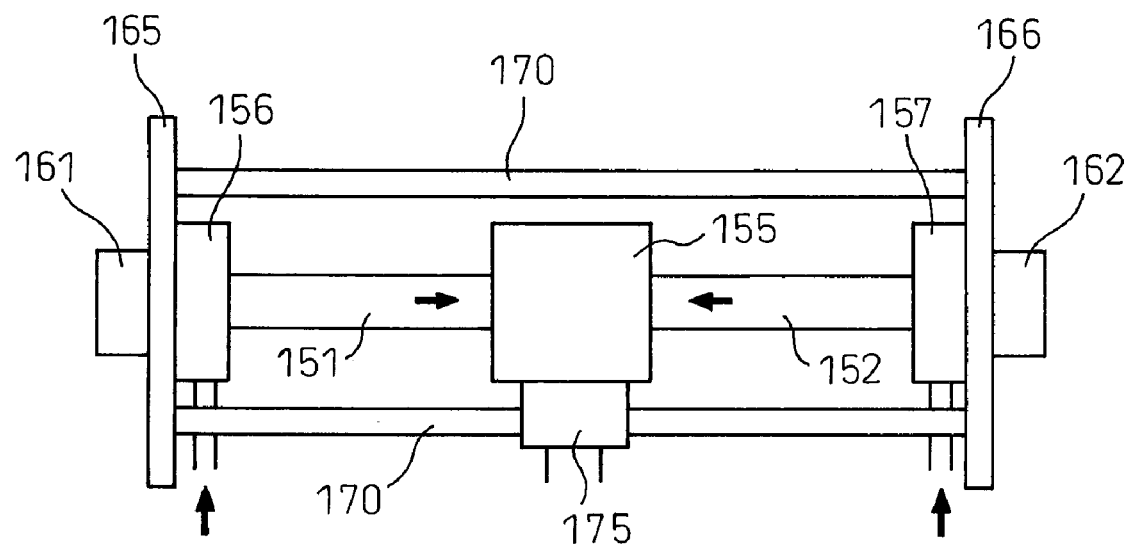
FIG. 7A is a schematic front view showing a conventional gas laser oscillator.
Figure 7B:
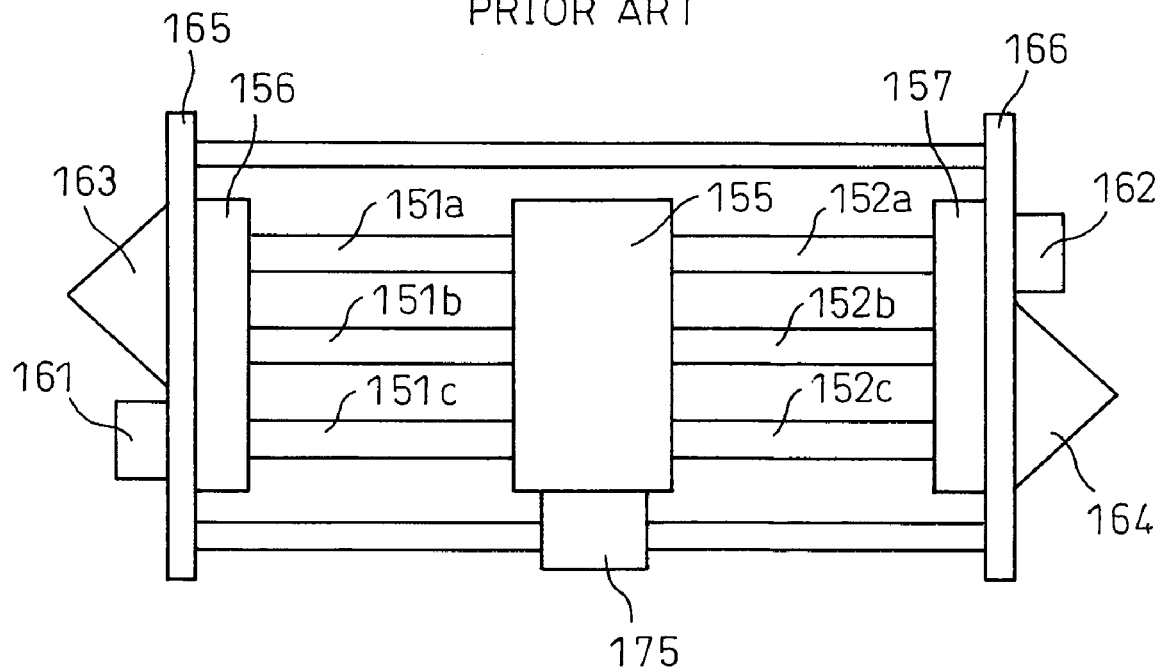
FIG. 7B is a schematic plan view of the gas laser oscillator shown in FIG. 7A.

FIG. 6A shows a gas laser oscillator configured such that two discharge tube arrays 3A, 3B, each including a pair of electrical discharge tubes 1a, 2a, 1b, 2b aligning in the axial direction thereof, are supported by a support mechanism 4 with the axes of the discharge tube arrays 3A, 3B extending in directions intersecting with each other. In this configuration, a single returning mirror 13 is disposed at an optical connection 8 between the discharge tube arrays 3A, 3B. FIGS. 6B and 6C show gas laser oscillators, each of which is configured such that two discharge tube arrays 3A, 3B, each including a pair of electrical discharge tubes 1a, 2a, 1b, 2b aligning in the axial direction thereof, are supported by a support mechanism 4 with the axes of the discharge tube arrays 3A, 3B extending in directions parallel to each other. In the configuration shown in FIG. 6B, two returning mirrors 13 are disposed at an optical connection 8 between the discharge tube arrays 3A, 3B. On the other hand, in the configuration shown in FIG. 6C, three returning mirrors 13 are disposed at an optical connection 8 between the discharge tube arrays 3A, 3B. In the double-returning mirror structure shown in FIG. 6B, 90-degrees linearly polarized laser beam is output from the output mirror 11, while in the triple-returning mirror structure shown in FIGS. 6C and 6D, 45-degrees linearly polarized laser beam is output from the output mirror 11. In either configuration, it is possible to prevent the misalignment of the optical axes of the output and rear mirrors 11, 12 from occurring due to the inertia and thermal expansion of the discharge tube linking holder 5, by the above-described characteristic configuration of the support mechanism 4.

As will be understood from the above description, according to the present invention, the discharge tube linking holder is joined to the support rod through the elastic member, so that it is possible to suppress the positional deviation of the discharge tube linking holder due to inertia, which may occur at a time when acceleration is applied to the gas laser oscillator, and also to absorb the deformation of the discharge tube linking holder due to thermal expansion, which may occur at a time when a laser beam is produced, by the elastic deformation of the elastic member. Consequently, it is possible to prevent the support rod from being subjected to strain or positional deviation when acceleration is applied to the discharge tube linking holder and also when the discharge tube linking holder is thermally deformed, suppress a positional deviation (an inclination, etc.) between the end plates caused due to the strain subjected to the support rod, etc., and thus prevent the optical axes of the output mirror and the rear mirror from being misaligned. Therefore, according to the invention, it is possible, when the gas laser oscillator is displaced or when the gas laser oscillator operates, to highly and precisely maintain a parallelism and positional correlation between the end plates and thus stably output a laser beam having desired quality.

While the invention has been described with reference to specific preferred embodiments, it will be understood, by those skilled in the art, that various changes and modifications may be made thereto without departing from the scope of the following claims.

The invention claimed is:
1. A gas laser oscillator comprising:
a plurality of discharge tube arrays, each discharge tube array including a plurality of electrical discharge tubes aligning in an axial direction thereof;
a support mechanism supporting said plurality of discharge tube arrays with axes of said discharge tube arrays extending in directions parallel to or intersecting with each other; and
an optical part optically connecting said plurality of discharge tube arrays to each other with all of said plurality of electrical discharge tubes of said discharge tube arrays being arranged optically in series;
wherein said optical part comprises:
an output minor and a rear mirror, disposed at respective one ends of a pair of electrical discharge tubes located at opposite ends of an optically serial arrangement of all of said plurality of electrical discharge tubes of said discharge tube arrays supported by said support mechanism; and
a returning minor disposed at an optical connection between said discharge tube arrays supported by said support mechanism; and
wherein said support mechanism comprises:
a discharge tube linking holder mutually linking and supporting said plurality of electrical discharge tubes of said each discharge tube array with said electrical discharge tubes aligning in said axial direction;
a pair of end plates disposed at axially opposite ends of said each discharge tube array, said end plates sup- porting said plurality of discharge tube arrays with said axes extending in directions parallel to or intersecting with each other;

a plurality of support rods fixed at opposite ends thereof to and extending between said pair of end plates;

an elastic member joining said discharge tube linking holder to a first support rod arranged at an upper side as seen in a direction of gravity; and a rigid member securing said discharge tube linking holder to a second support rod arranged at a lower side as seen in a direction of gravity.

2. A gas laser oscillator, as set forth in claim 1, wherein said elastic member comprises a spring.

3. A gas laser oscillator, as set forth in claim 1, wherein said elastic member comprises a plurality of sheet metals connected to each other by a fastening screw.

4. A gas laser oscillator, as set forth in claim 1, wherein said support mechanism comprises at least one first said discharge tube linking holder disposed at a location at which laser gas is supplied to said plurality of discharge tube arrays and at least one second said discharge tube linking holder disposed at a location at which laser gas is extracted from said plurality of discharge tube arrays; wherein said first discharge tube linking holder is secured, through said rigid member, respectively to said first support rod and said second support rod; and wherein said second discharge tube linking holder is joined, through said elastic member, to said first support rod, and is secured, through said rigid member, to said second support rod.

* * * * *